United States Patent [19]

Miller et al.

[11] Patent Number: 5,745,347
[45] Date of Patent: Apr. 28, 1998

[54] ADAPTER FOR CONNECTING AIRBAG ACCELEROMETER TO A PRINTED CIRCUIT BOARD AND ASSEMBLY THEREOF

[75] Inventors: Timothy J. Miller, Warren, Pa.; Eric D. Bowman, Lake Orion, Mich.

[73] Assignee: OSRAM Sylvania Inc., Danvers, Mass.

[21] Appl. No.: 728,724

[22] Filed: Oct. 11, 1996

[51] Int. Cl.$^6$ .................................................. H05K 7/04
[52] U.S. Cl. .................. 361/813; 361/807; 361/809; 439/80; 439/34; 439/620; 73/493
[58] Field of Search ........................... 361/785, 807–809, 361/813, 823, 825; 439/43, 79, 80, 620, 34; 73/493, 514.01, 514.35; 280/735

[56] References Cited

U.S. PATENT DOCUMENTS 5,252,080  10/1993  Pesson ............................................ 439/80
5,446,626  8/1995  Dittmann et al. ............................ 361/813

*Primary Examiner*—Leo P. Picard
*Assistant Examiner*—John B. Vigushin
*Attorney, Agent, or Firm*—William H. McNeill

[57] ABSTRACT

An adapter is provided for electrically connecting a printed circuit board to an airbag accelerometer. The adapter includes a leadframe housing to which is joined a leadframe, as, for example, by embedding the leadframe within the leadframe housing during insert molding thereof. The leadframe includes connector tails which extend in a first direction for connection to a printed circuit board and facing segments which face in a second direction for connection to an airbag accelerometer. The first and second directions are angularly disposed relative to each other. An adjuster assembly which includes such an adjuster is also provided.

15 Claims, 4 Drawing Sheets

ADAPTER FOR CONNECTING AIRBAG ACCELEROMETER TO A PRINTED CIRCUIT BOARD AND ASSEMBLY THEREOF

TECHNICAL FIELD

The present invention relates to an adapter for use in electrically connecting an airbag accelerometer to a printed circuit board wherein the airbag accelerometer has a horizontal mounting plane and the printed circuit board has a printed circuit board mounting plane which is disposed at an angle relative to the horizontal mounting plane. An adapter assembly is also provided which comprises such an adapter mechanically and electrically connected to an airbag accelerometer and a printed circuit board.

BACKGROUND ART

Airbag accelerometers are well known in the art. An airbag accelerometer is used to detect if an airbag should be inflated. Such an accelerometer must be mounted in a predetermined orientation relative to the airbag module with which it is associated. Many airbag accelerometers are mounted in a horizontal manner to facilitate actuation of an airbag of an airbag module which is mounted horizontally in the front of a vehicle. For example, FIG. 1 depicts a typical airbag accelerometer assembly 2 which includes a conventional airbag accelerometer 4 and a printed circuit board 6, the airbag accelerometer having leads 8 which are adapted to extend through apertures 10 in the printed circuit board so that the leads may be electrically and mechanically connected to the circuitry of the printed circuit board by soldering in the usual manner. In order to function as desired, the airbag accelerometer must be mounted in a horizontal mounting plane 4' which coincides with or is parallel to a horizontal plane of the airbag module. Such a plane is a plane which is generally parallel to the surface upon which the vehicle is intended to travel. In the typical application designed for use with a front airbag, the printed circuit board 6 to which the airbag accelerometer 4 is connected extends in a mounting plane 6' which is substantially parallel to the horizontal mounting plane 4' of the airbag accelerometer, as illustrated in FIG. 1. Accordingly, in such an application, the printed circuit board is oriented in the same manner as the accelerometer which is oriented in the same manner as the airbag module. However, in some instances, it is desirable to mount the printed circuit board such that its mounting plane is not parallel to the horizontal mounting plane of the airbag accelerometer connected thereto. Being able to mount the printed circuit board in a mounting plane which is disposed at an angle relative to the horizontal mounting plane of the airbag accelerometer provides increased packaging options for the placement of airbag modules associated with the accelerometer. For example, with the introduction of side airbags such an option is desirable.

DISCLOSURE OF THE INVENTION

It is therefore an object of the present invention to provide an adapter, for electrically connecting an airbag accelerometer to a printed circuit board, which obviates the disadvantages of the prior art.

It is another object of the present invention to provide such an adapter which allows for mounting an airbag accelerometer to a printed circuit board such that the accelerometer horizontal mounting plane is disposed at an angle relative to the printing circuit board mounting plane.

It is yet another object of the present invention to provide such an adapter which increases the packaging options for the placement of airbag modules.

It is a further object of the present invention to provide such an adapter which may be used with a side airbag without the requirement that the airbag accelerometer horizontal mounting plane coincide with or be parallel to the printed circuit board mounting plane.

It is another object of the present invention to provide an adapter assembly which satisfies all of the foregoing objects.

This invention achieves these and other objects by providing an adapter for use in electrically connecting accelerometer leads of an airbag accelerometer to a printed circuit board. The airbag accelerometer comprises a horizontal mounting plane and the printed circuit board comprises a printed circuit board mounting plane which is disposed at an angle relative to the horizontal mounting plane. The adapter comprises a leadframe housing and a leadframe joined to the leadframe housing. The leadframe comprises a plurality of printed circuit board connecting tails which extend in a first direction and a plurality of airbag accelerometer facing segments, each facing segment being disposed so as to face in a second direction. The second direction is oriented at an angle relative to the first direction. The leadframe may be embedded within the leadframe housing and the housing may comprise a plurality of openings exposing respective of the facing segments. In such an embodiment, the facing segments may comprise apertures which extend through the leadframe.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
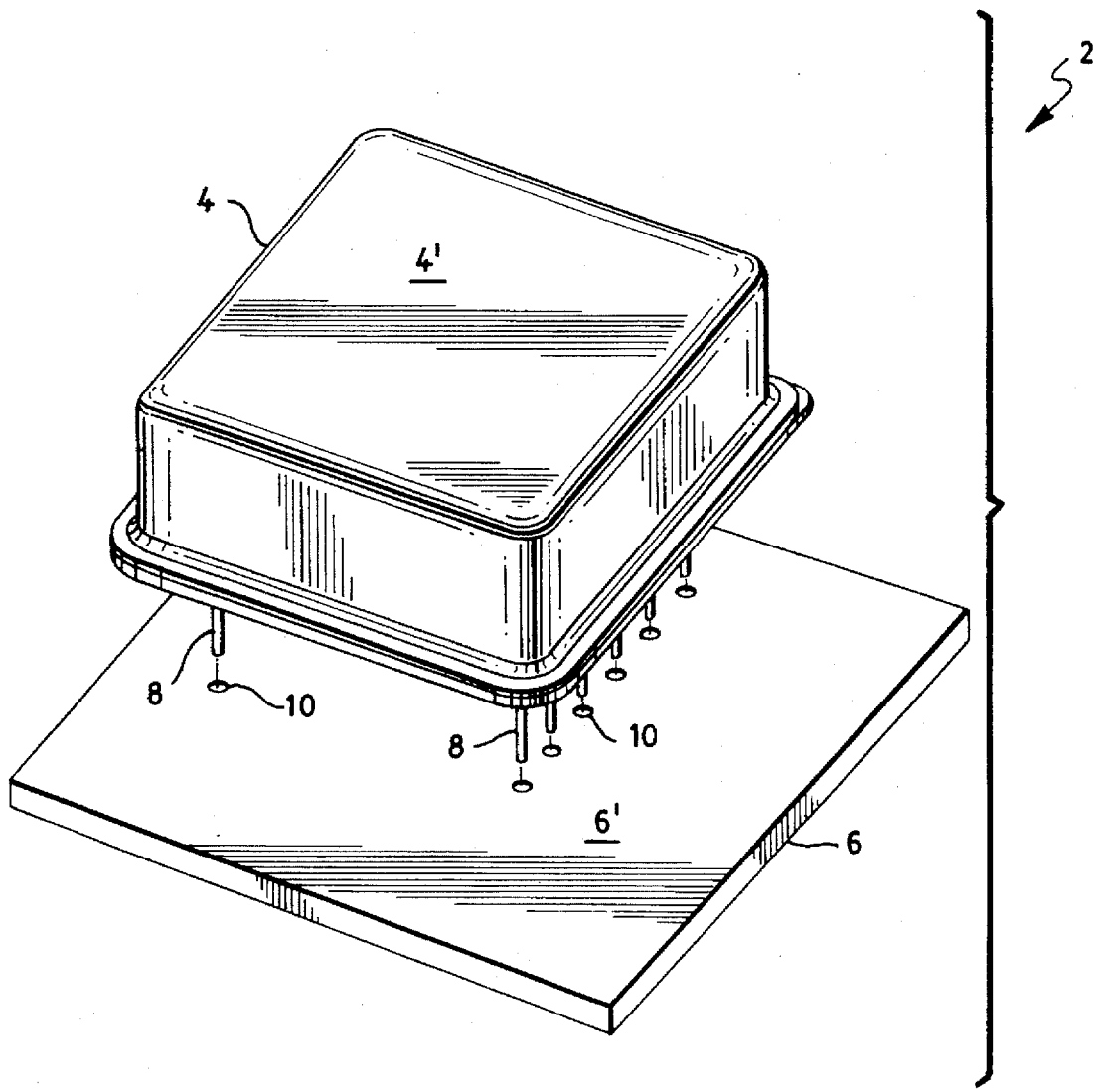
FIG. 1 is an example of a prior art airbag accelerometer mounted to a printed circuit board.
Figure 2:
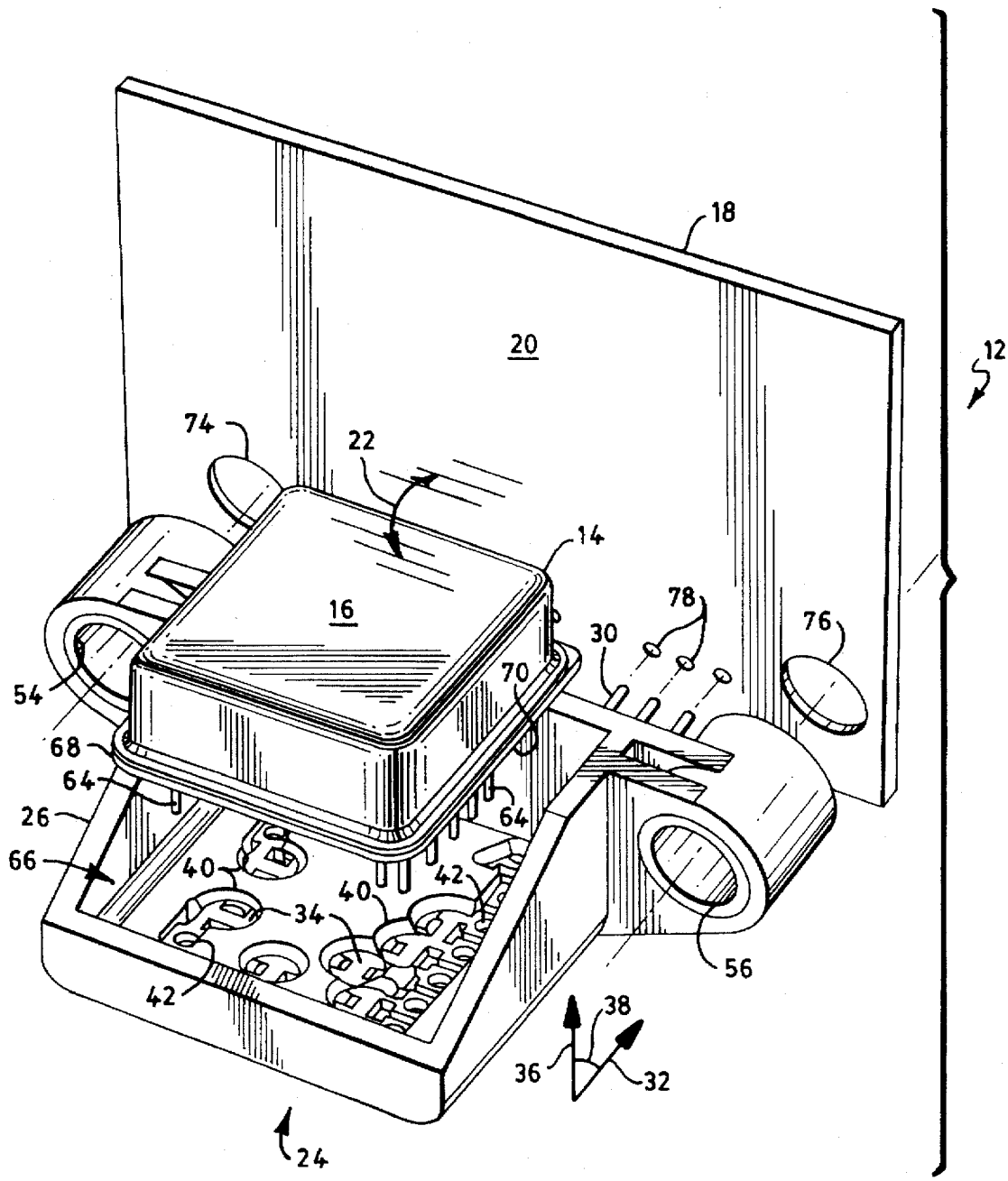
FIG. 2 is an exploded perspective view of one embodiment of the adapter assembly of the present invention.

The embodiment of this invention which is illustrated in the drawings is particularly suited for achieving the objects of this invention. FIG. 2 depicts an adapter assembly 12 of the present invention. Adapter assembly 12 comprises a conventional airbag accelerometer 14 which has a horizontal mounting plane 16, and a printed circuit board 18 which has a mounting plane 20. Unlike the assembly of FIG. 1, mounting planes 16 and 20 are disposed at an angle 22 relative to each other. In the embodiment of FIG. 2, angle 22 is 90°. To effect such angular orientation between the airbag accelerometer 14 and printed circuit board 18, an adapter 24 is provided as explained herein.

The adapter of the present invention is provided for use in electrically connecting the accelerometer leads of the airbag accelerometer to the printed circuit board in those instances where the airbag accelerometer has a horizontal mounting plane and the printed circuit board has a printed circuit board mounting plane which are disposed at an angle relative each other.

Such an adapter comprises a leadframe housing having a leadframe joined thereto, the leadframe comprising a plurality of connecting tails which extend in a first direction for electrical and mechanical connection to the printed circuit board, and a plurality of airbag accelerometer facing segments which are disposed so as to face in a second direction for attachment of the accelerometer leads thereto, the second direction being oriented at an angle relative to the first direction. Adapter 24 provides such a device.

Figure 3:
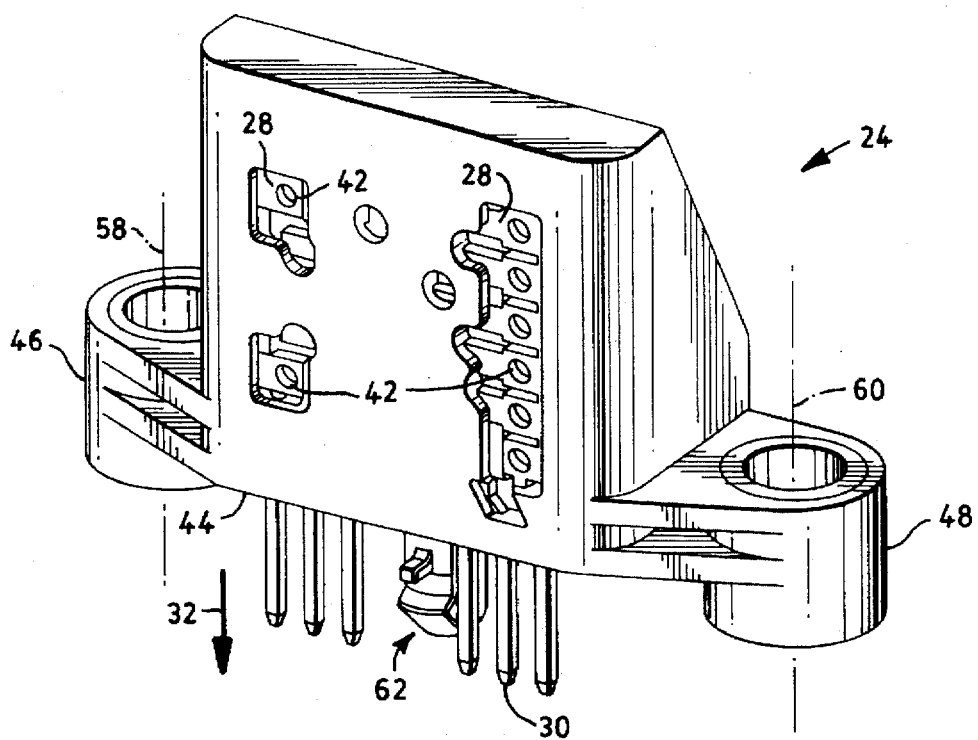
FIG. 3 is a perspective view of one side of the adapter of the adapter assembly depicted in FIG. 2.
Figure 4:
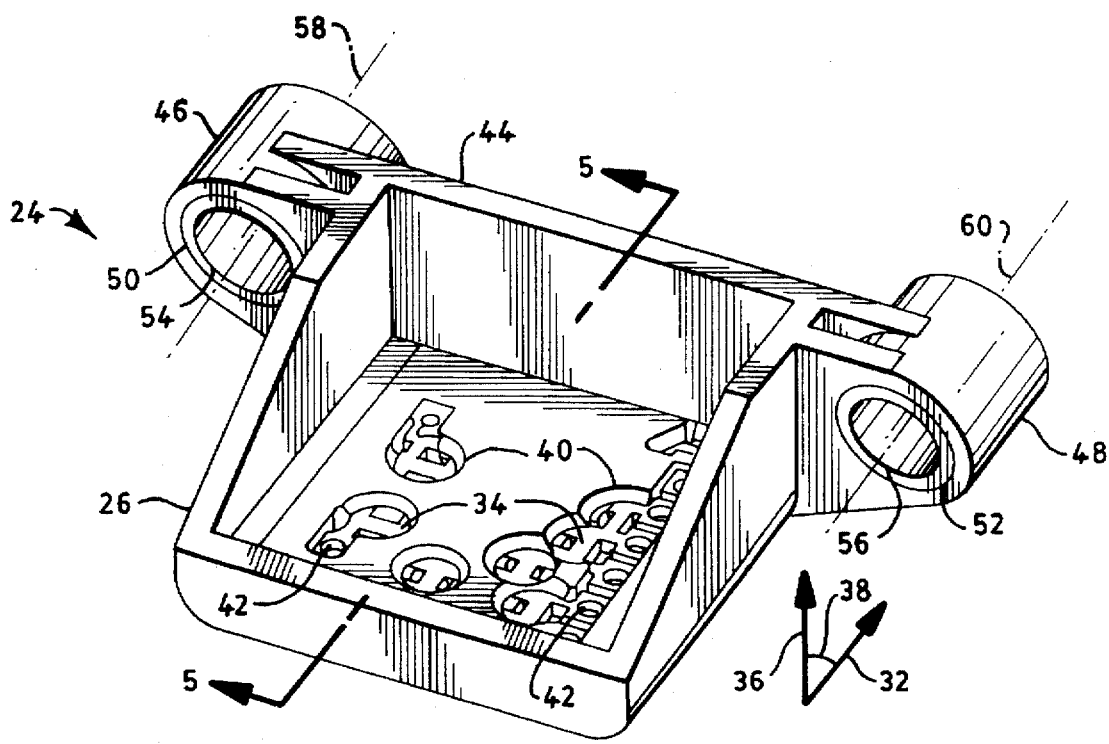
FIG. 4 is a perspective view of an opposite side of the adapter of FIG. 3.

With reference to FIGS. 2 to 4, adapter 24 comprises a leadframe housing 26 having a leadframe 28 joined thereto. In this embodiment, the leadframe 28 is embedded within the leadframe housing 26. To this end, the leadframe housing 26 may be insert molded with the leadframe 28 in a conventional manner so that the leadframe is contained within the plastic of the leadframe housing. Leadframe 28 comprises a plurality of printed circuit board connecting tails 30 which extend in a first direction 32. Leadframe 28 also comprises a plurality of airbag accelerometer facing segments 34, each facing segment facing in a second direction 36 which is oriented at an angle 38 relative to the first direction 32 in which the connecting tails 30 extend.

To this end, during the insert molding process the leadframe housing 26 is formed having a plurality of openings 40 which expose the facing segments 34 of the leadframe 28 embedded in the leadframe housing. In the embodiment of FIGS. 2 to 4, the facing segments 34 comprise respective openings 42 which extend through the leadframe 28. Similarly, the insert molding process is effected so that the connecting tabs 30 extend through a side 44 of the leadframe housing 26.

The leadframe housing may comprise first and second mounting bushings, having respective mounting axes which extend in the direction 32, useful in mounting the adapter to the printed circuit board. For example, in the embodiment of FIGS. 2 to 4, during the insert molding process, the leadframe housing 26 may be provided with wings 46 and 48 having respective apertures 50 and 52 into which brass bushings 54 and 56 extend, bushings 54 and 56 having a respective mounting axis 58 and 60 which extends in the direction 32. The adapter of the present invention may comprise an alignment member which extends from the leadframe housing to facilitate alignment of the adapter with the printed circuit board. For example, during the insert molding process the leadframe housing 26 may be formed having an alignment member 62 which extends from side 44 in the direction 32, as depicted in FIG. 3.

In considering assembling the adapter assembly 12 of FIG. 2, the accelerometer leads 64 are inserted into respective openings 42, which extend through the leadframe 28 at the facing segments 34, and soldered to the leadframe in a conventional manner to form an electrical and mechanical connection between the airbag accelerometer 14 and the leadframe. Alignment of the accelerometer leads 64 with the openings 42 may be facilitated by fabricating the leadframe housing 26 in such a manner as to provide an opening 66 which is configured to mate with the outer periphery 68 of a base 70 of the airbag accelerometer 14.

Figure 5:
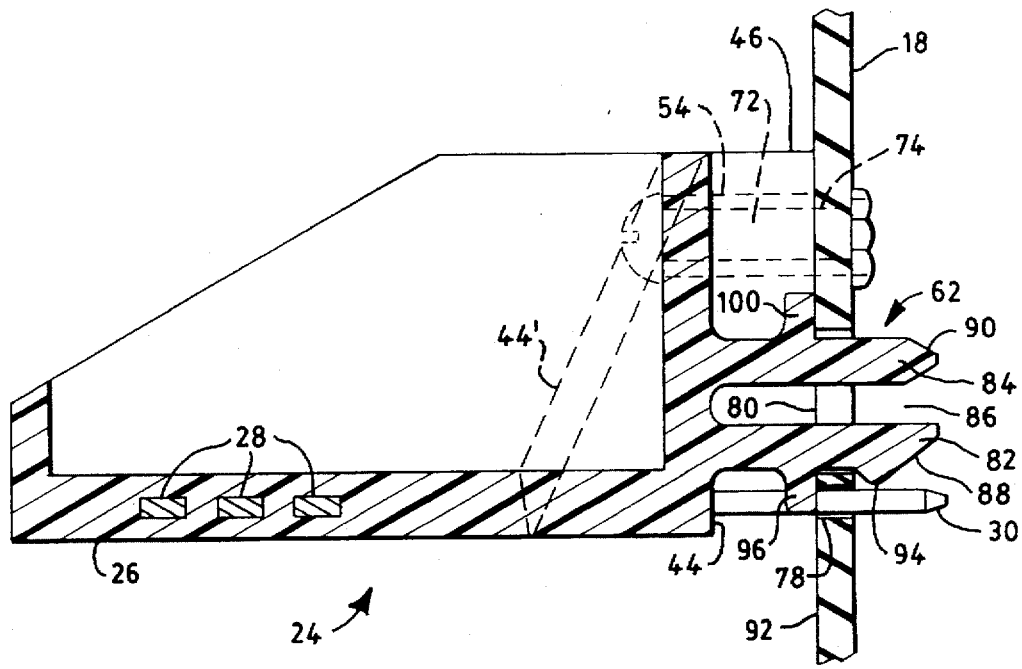
FIG. 5 is a view of the adapter of FIG. 4 along lines 5—5, attached to a printed circuit board and fastener.
Figure 6:
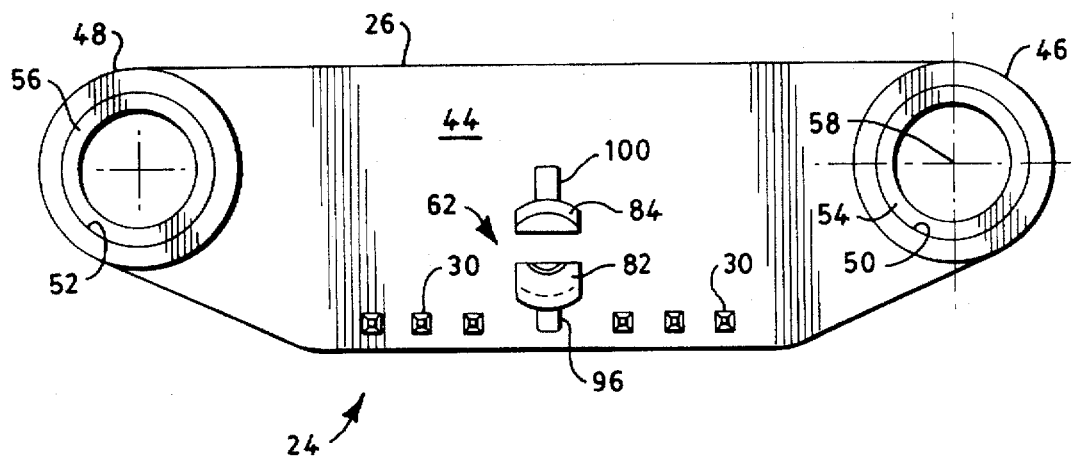
FIG. 6 is an end view of the adapter of FIG. 5 with the printed circuit board and fastener deleted for clarity.

The leadframe housing 26 may be mounted to the printed circuit board 18 by respective fasteners such as screws or bolts 72, one being shown in FIG. 5, which extend through the bushings 54 and 56 and through respective apertures 74 and 76 which extend through the printed circuit board. During such mounting of the airbag accelerometer 14 to the printed circuit board 18, the connecting tails 30 are inserted through respective apertures 78 which extend through the printed circuit board. Alignment of the leadframe housing 26 with the printed circuit board 18 during mounting thereto is facilitated by the alignment member 62. With reference to FIGS. 5 and 6, the alignment member 62 protrudes from side 44 of the leadframe housing 26 and is configured for insertion into an alignment aperture 80 which extends through the printed circuit board 18. To this end, the alignment member 62 comprises two opposing resilient legs 82 and 84 having a space 86 therebetween. The distal ends of such legs include respective tapered end portions 88 and 90 which are configured so that when the alignment member 62 is inserted into alignment aperture 80, such end portions will engage the surface 92 of the printed circuit board so as to cam resilient legs 82 and 84 towards each other until a protruding segment 94 of end portion 88 has been inserted through the aperture 80 so as to allow legs 82 and 84 to snap away from each other. In this manner, the alignment member 62 comprises a snap fastener which locks the printed circuit board 18 between the projecting segment 94 and protruding detents 96 and 100 of legs 82 and 84, respectively.

When the leadframe housing 26 has been attached to the printed circuit board 18 such that connecting tails 30 extend through respective apertures 78, the connecting tails may be soldered to the printed circuit board circuitry in the conventional manner to form an electrical and mechanical connection between the leadframe 28 and the printed circuit board circuitry. In this manner an electrical connection is provided between the printed circuit board circuitry 18 and the airbag accelerometer 14 through the leadframe 28, the printed circuit board having a mounting plane 20 which is disposed at an angle 22 relative to the horizontal mounting plane 16 of the airbag accelerometer. Although angle 22 is 90°, it will be apparent to those skilled in the art that any other angular relationship between the airbag accelerometer 14 and printed circuit board 18 may be provided. For example, and without limitation, such angular relationship may be altered by providing a leadframe housing 26 having a side 44 which extends at an angle as depicted at 44' in FIG. 5. Regardless of the angle 22 selected, the adapter of the present invention allows for mounting the printed circuit board, to which the airbag accelerometer is electrically connected, in an orientation wherein the printed circuit board mounting plane will be other than parallel to the horizontal mounting plane of the airbag accelerometer.

To this end, an adapter is provided which is adapted for connection between the airbag accelerometer and the printed circuit board.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is::

1. An adapter for use in electrically connecting accelerometer leads of an airbag accelerometer to a printed circuit board, said airbag accelerometer having a horizontal mounting plane and said printed circuit board having a printed circuit board mounting plane which is disposed at an angle relative to said horizontal mounting plane, comprising:

a leadframe housing; and a leadframe embedded within said leadframe housing, said leadframe comprising a plurality of printed circuit board connecting tails which extend in a first direction and a plurality of airbag accelerometer facing segments, each facing segment being comprised of apertures which extend through said leadframe and being disposed so as to face in a second direction, said second direction being oriented at an angle relative to said first direction, said leadframe housing further comprising a plurality of openings exposing respective ones of said plurality of facing segments.

2. The adapter of claim 1 wherein said leadframe housing comprises first and second mounting bushings, each mounting bushing having a mounting axis which extends in said first direction.

3. The adapter of claim 1 further including an alignment member extending from said leadframe housing in said first direction.

4. The adapter of claim 3 wherein said alignment member comprises a snap fastener.

5. The adapter of claim 1 wherein said leadframe housing comprises first and second mounting bushings, each mounting bushing having a mounting axis which extends in said first direction.

6. The adapter of claim 5 further including an alignment member extending from said leadframe housing in said first direction.

7. The adapter of claim 6 wherein said alignment member comprises a snap fastener.

8. The adapter of claim 1 wherein said angle is substantially 90°.

9. An adapter assembly, comprising:

a leadframe housing;

a leadframe joined to said leadframe housing, said leadframe comprising a of airbag accelerometer facing segments, each facing segment being disposed so as to face in a second direction, said second direction being oriented at an angle relative to said first direction; an airbag accelerometer having a horizontal mounting plane, and a plurality of accelerometer leads, accelerometer leads of said plurality of accelerometer leads being electrically and mechanically connected to respective facing segments; and a printed circuit board having a mounting plane which is disposed at an angle relative to said horizontal mounting plane, connecting tails of said plurality of connecting tails being electrically and mechanically connected to said circuit board.

10. The adapter assembly of claim 9 wherein said leadframe is embedded within said leadframe housing, said housing comprising a plurality of openings exposing respective ones of said plurality of facing segments to respective ones of said accelerometer leads.

11. The adapter assembly of claim 10 wherein facing segments of said plurality of facing segments comprise apertures which extend through said leadframe, respective ones of said accelerometer leads extending through respective ones of said apertures.

12. The adapter assembly of claim 9 wherein said leadframe housing comprises first and second mounting bushings, each mounting bushing having a mounting axis which extends in said first direction, a fastener extending through a respective bushing and mechanically attaching said leadframe housing to said printed circuit board.

13. The adapter assembly of claim 9 wherein said leadframe housing comprises an alignment member which extends from said leadframe housing in said first direction and mates with an alignment aperture which extends through said printed circuit board.

14. The adapter assembly of claim 13 wherein said alignment member comprises a snap fastener which attaches said leadframe housing to said printed circuit board.

15. The adapter assembly of claim 9 wherein said angle is substantially 90°.

* * * * *